(12) United States Patent
Knight

(10) Patent No.: US 7,186,914 B1
(45) Date of Patent: Mar. 6, 2007

(54) LOOPED CABLE LOCKING BOX ASSEMBLY

(76) Inventor: Keith A. Knight, P.O. Box 934996, Margate, FL (US) 33093

( * ) Notice: Subject to any disclaimer, the term of this patent is extended or adjusted under 35 U.S.C. 154(b) by 0 days.

(21) Appl. No.: 11/255,632

(22) Filed: Oct. 24, 2005

(51) Int. Cl.
*H01J 5/00* (2006.01)

(52) U.S. Cl. .................... 174/50; 174/53; 220/4.02; 70/57

(58) Field of Classification Search ............... 174/50, 174/53; 220/4.02; 439/535; 248/906; 70/57, 70/57.1, 58, 49
See application file for complete search history.

(56) References Cited

U.S. PATENT DOCUMENTS 3,700,834 A * 10/1972 Schaefer ............... 191/12.2 R
5,773,757 A * 6/1998 Kenney et al. ............... 174/53

* cited by examiner

*Primary Examiner*—Dhiru R. Patel
(74) *Attorney, Agent, or Firm*—Oltman, Flynn & Kubler

(57) ABSTRACT

A locking box assembly includes a length of cable having a cable secured end and a cable locking end; a cable retaining structure; and a locking box for retaining the cable, the cable secured end being fastened to the locking box with the cable retaining structure, the locking box having a box wall with a cable deploying port and a cable locking port having a port lock for receiving the cable locking end and locking the cable; so that the cable can be deployed from the locking box through the cable deploying port, looped to engage an object to be secured, and the cable locking end then fitted into the cable locking port so that the port lock engages the cable locking end.

10 Claims, 3 Drawing Sheets

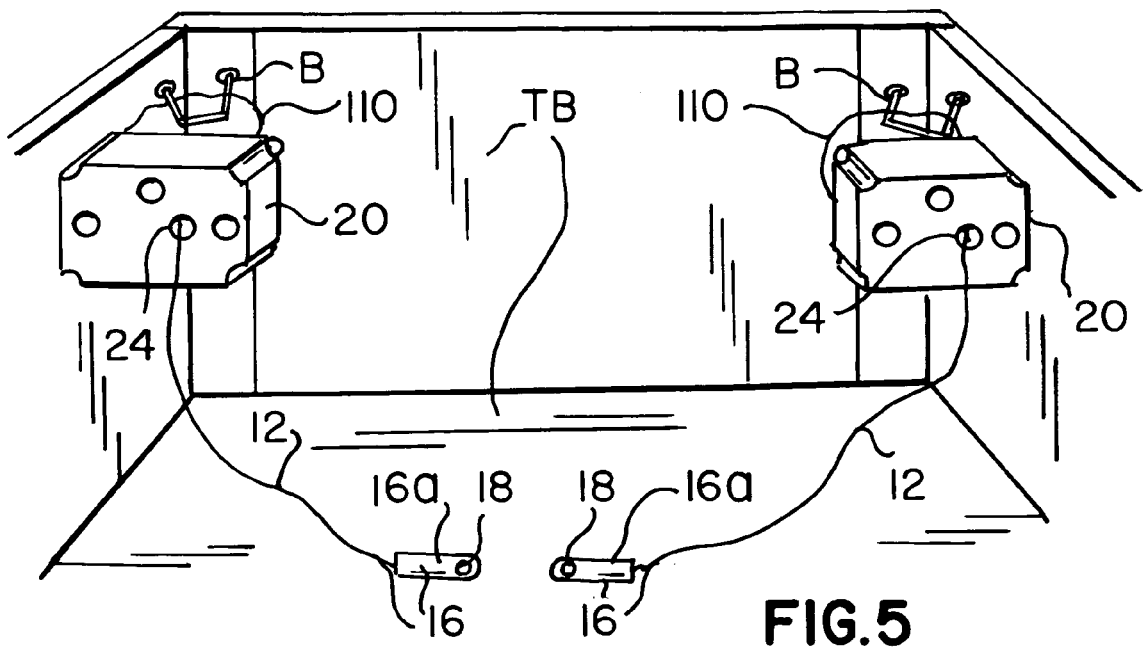
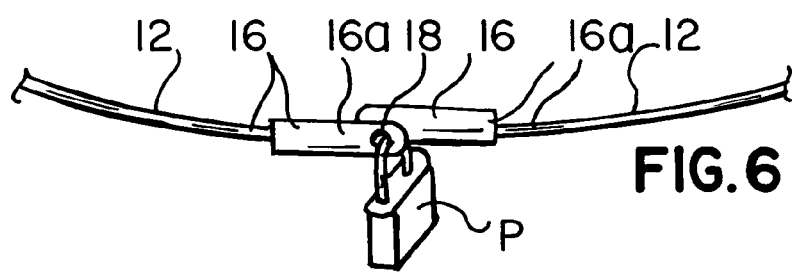
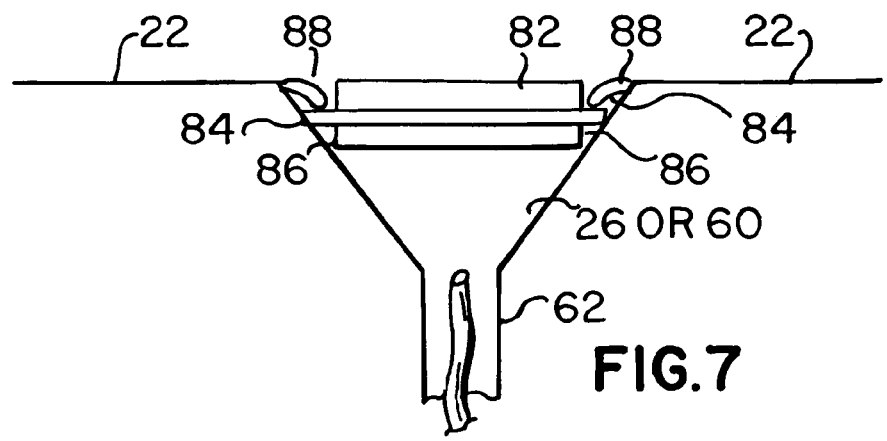

LOOPED CABLE LOCKING BOX ASSEMBLY

BACKGROUND OF THE INVENTION

1. Field of the Invention

The present invention relates generally to the field of locking mechanisms and assemblies. More specifically the present invention relates to a locking box assembly including a locking box containing a length of locking cable having a locking cable secured end fastened to the locking box with cable retaining means and having a locking cable locking end, the locking box having a box wall with a locking cable deploying port and at least one cable locking port containing a port lock for receiving the cable locking end and locking the cable, so that the cable can be can be deployed from the locking box through the cable deploying port, looped through an object to be secured and optionally around an anchoring object as well, and the cable locking end then fitted into the cable locking port so that the port lock engages the cable locking end. An outwardly directed port lock key slot, or a combination lock dial preferably is provided on the box wall adjacent the corresponding cable locking port for receiving a key to open the port lock to release the cable locking end from the cable locking port. Alternatively, where the lock provides permanent engagement there is not key slot.

The locking box preferably additionally includes at least one cable passageway extending through the locking box so that the cable can be looped around an object and the cable locking end then inserted into a first passageway end, passed through the box and out of the second passageway end. The cable locking end then can be inserted into and locked within a cable locking port, or a passageway lock may be provided in the cable passageway to lock either the cable locking end or a portion of the cable beyond the cable locking end within the passageway. Once again, an outwardly directed passageway lock key slot or a combination lock dial preferably is provided on the box wall adjacent the corresponding cable passageway for receiving a key to open the passageway lock to release the cable from the cable passageway. Cable retaining means are provided preferably including a spring loaded cable spool around which the cable is wound, the spool being rotatably mounted to spool mounting means in the locking box. A separate anchoring cable preferably is fitted into a locking port and through a cable passageway so that the anchoring cable fits through or around an anchoring object such as a post and can be pulled tight around the anchoring object through the cable passageway.

2. Description of the Prior Art

There have long been locking assemblies for bicycles and other objects subject to theft. Padlocks with long U-shaped bolts have been provided. Some locking assemblies have included a cable having a locking stud end and a locking receptacle end so that the cable can be looped around or through an object such as a bicycle wheel and optionally around or through an anchoring object such as a bicycle rack, and the locking stud locked into the locking stud end. A problem with these cable devices have been that the cable either is too short for many applications or is long enough to form a large loose bundle difficult to carry and subject to becoming tangled.

It is thus an object of the present invention to provide a locking box assembly which compactly contains stores without tangling, a substantial length of cable for looping around an object to be secured and includes means for locking the cable at two spaced apart points to the locking box to secure the object.

It is another object of the present invention to provide such a locking box assembly which deploys only the length of cable needed for given use and which can be secured to an anchoring object such as a bracket in a pickup truck bed or a pole to securely link the object to be secured to the anchoring object.

It is still another object of the present invention to provide such a locking box assembly in which the cable can be passed through the locking box and the cable locking end then secured to the locking box to form at least two separate loops on opposing sides of the locking box for securing two or more objects.

It is finally an object of the present invention to provide such a locking box assembly which is durable, easy to use and inexpensive to manufacture.

SUMMARY OF THE INVENTION

The present invention accomplishes the above-stated objectives, as well as others, as may be determined by a fair reading and interpretation of the entire specification.

A locking box assembly is provided including a length of cable having a cable secured end and a cable locking end; a cable securing structure; and a locking box for retaining the cable, the cable secured end being fastened to the locking box with the cable securing structure, the locking box having a box wall with a cable deploying port and a cable locking port having a port lock for receiving the cable locking end and locking the cable; so that the cable can be can be deployed from the locking box through the cable deploying port, looped to engage an object to be secured, and the cable locking end then fitted into the cable locking port so that the port lock engages the cable locking end.

The locking box assembly preferably additionally includes an outwardly directed port lock key slot on the box wall adjacent the corresponding cable locking port for receiving a key to open the port lock to release the cable from the cable locking port. The locking box assembly still preferably additionally includes at least one cable passageway extending through the locking box having a first passageway end and a second passageway end, so that the cable can be deployed and looped to engage an object and the cable locking end then be inserted into the first passageway end, passed through the box and out of the second passageway end, and the cable locking end then can be one of: inserted into and locked within a cable locking port and engaged by a passageway lock within the cable passageway.

The locking box assembly preferably further includes an outwardly directed passageway lock key slot on the box wall adjacent the corresponding the cable passageway for receiving a key to open the passageway lock to release the cable from the cable passageway. The locking box assembly preferably yet further includes cable retaining structure, the cable retaining structure including a cable spool around which the cable is wound, the spool being rotatably mounted to spool mounting structure in the locking box; where the spool rotates in a cable deploying direction to dispense the cable through the cable deploying port as a user manually pulls the cable out of the locking box. The cable spool preferably is spring biased by a biasing spring to rotate in a cable retracting direction, to automatically retract and gather the cable on the spool upon release of the cable.

The locking box assembly preferably additionally includes a releasable spool holding mechanism causing the spool to lock against rotation when released when the cable is deployed to any given length, and then is unlocked so that the cable biasing structure rotates the spool to retract the cable upon the user abruptly pulling the cable a short distance outwardly from the box and then releasing the cable to retract into the locking box. The locking box assembly preferably yet additionally includes plugs for fitting into and closing the cable locking port and the cable passageway first and second ends.

A locking box assembly is further provided including a length of cable having a cable secured end and a cable locking end; a cable securing structure; and a locking box for retaining the cable, the cable secured end being fastened to the locking box with the cable securing structure, the locking box having a box wall with a cable deploying port and having at least one cable passageway extending through the locking box having a first passageway end and a second passageway end in the box wall, so that the cable can be deployed and looped to engage an object and the cable locking end then be inserted into the first passageway end, passed through the box and out of the second passageway end, and the cable locking end then can be engaged by a passageway lock within the cable passageway; so that the cable can be can be deployed from the locking box through the cable deploying port, looped to engage an object to be secured, and the cable locking end then fitted into and through the cable passageway so that the passageway lock engages the cable. The locking box assembly preferably further includes a cable locking port having a port lock for receiving the cable locking end and locking the cable.

BRIEF DESCRIPTION OF THE DRAWINGS

Various other objects, advantages, and features of the invention will become apparent to those skilled in the art from the following discussion taken in conjunction with the following drawings, in which:

FIG. 5 is a perspective view of the rear of a truck bed showing a locking box assembly secured with its anchoring cable to each truck bed bracket in bed rear corners.

FIG. 6 is a side view of cable locking ends from two separate locking box assemblies with a padlock shown locked through the cable locking end holes.

FIG. 7 is a broken away side view of a plug positioned for fitting into a cable locking port, and which can also be fitted into ends of a cable passageway.

DETAILED DESCRIPTION OF THE PREFERRED EMBODIMENTS

Figure 1:
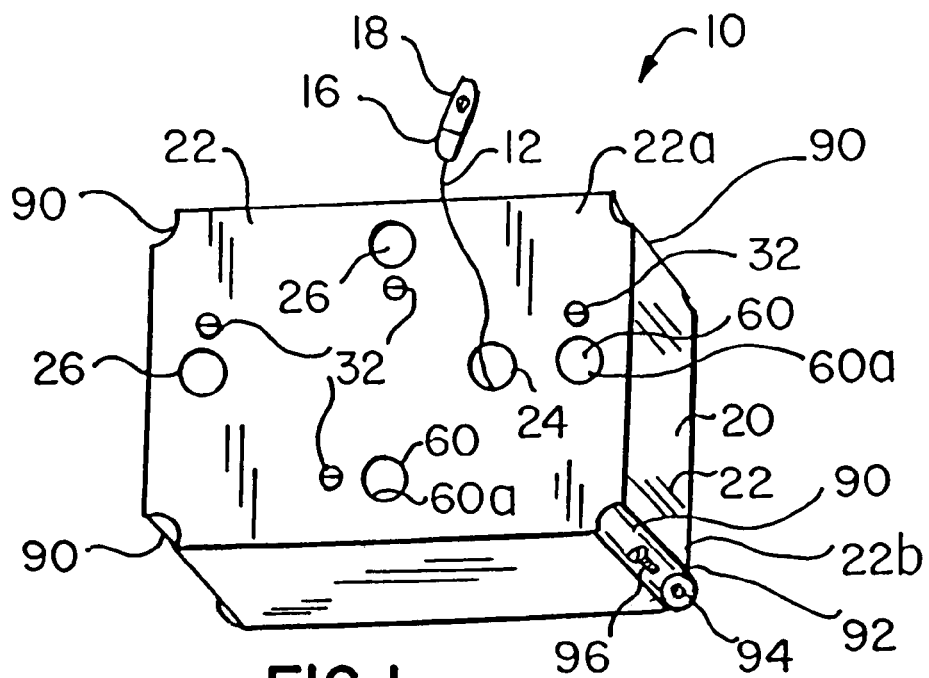
FIG. 1 is a perspective view of the locking box assembly first embodiment showing the cable looped through a bicycle wheel.
Figure 2:
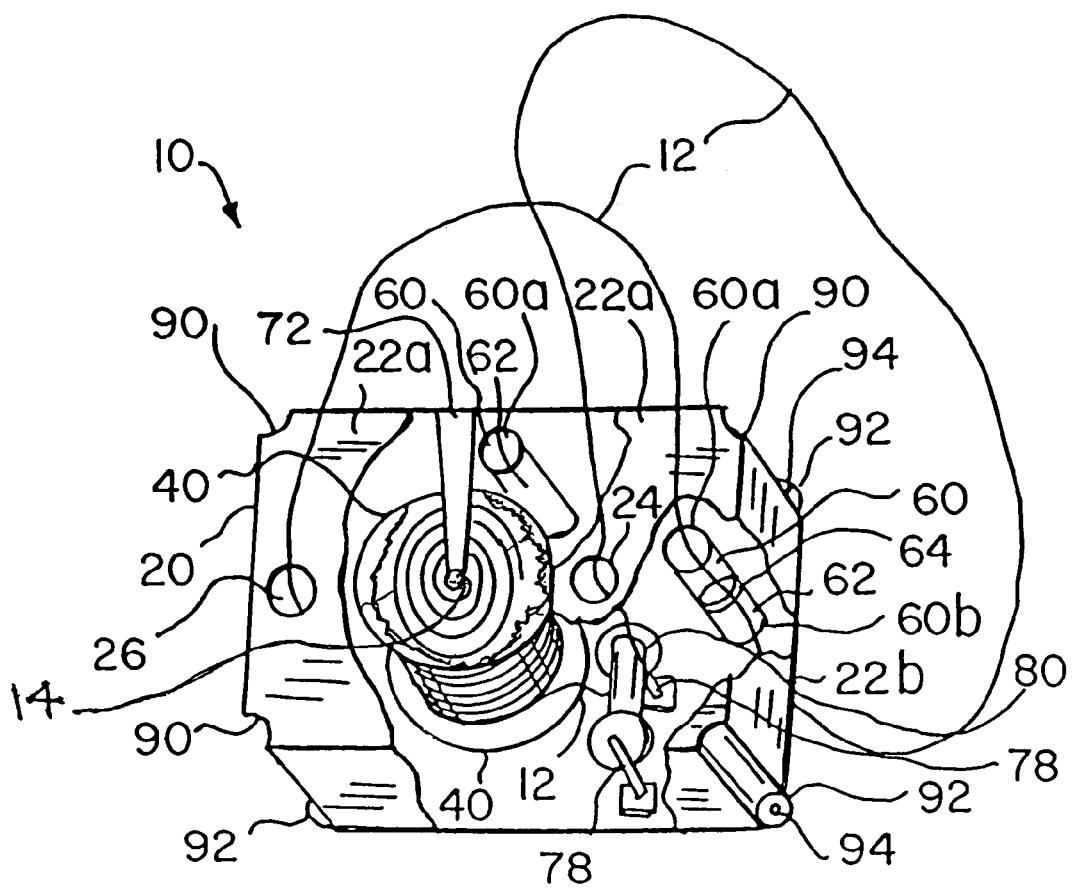
FIG. 2 is a broken away perspective view of the locking assembly as in FIG. 1, revealing the cable spool, idler pulley, and other elements of the assembly within the locking box.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings, wherein like characteristics and features of the present invention shown in the various FIGURES are designated by the same reference numerals.

FIRST PREFERRED EMBODIMENT

Referring to FIGS. 1–7, a locking box assembly 10 is disclosed including a locking box 20 containing a length of locking cable 12 having a cable secured end 14 fastened within the locking box 20 with cable retaining means 40 and having a cable locking end 16, the locking box 20 having a box wall 22 with a cable deploying port 24 and at least one cable locking port 26 containing a port lock 28 for receiving the cable locking end 16 and locking the cable 12. A plate and cable end receiving cup combination 16*a* is provided as part of cable locking end 16 having a cable locking end hole 18 for receiving a bolt of a padlock P. See FIGS. 5 and 6.

Figure 3:
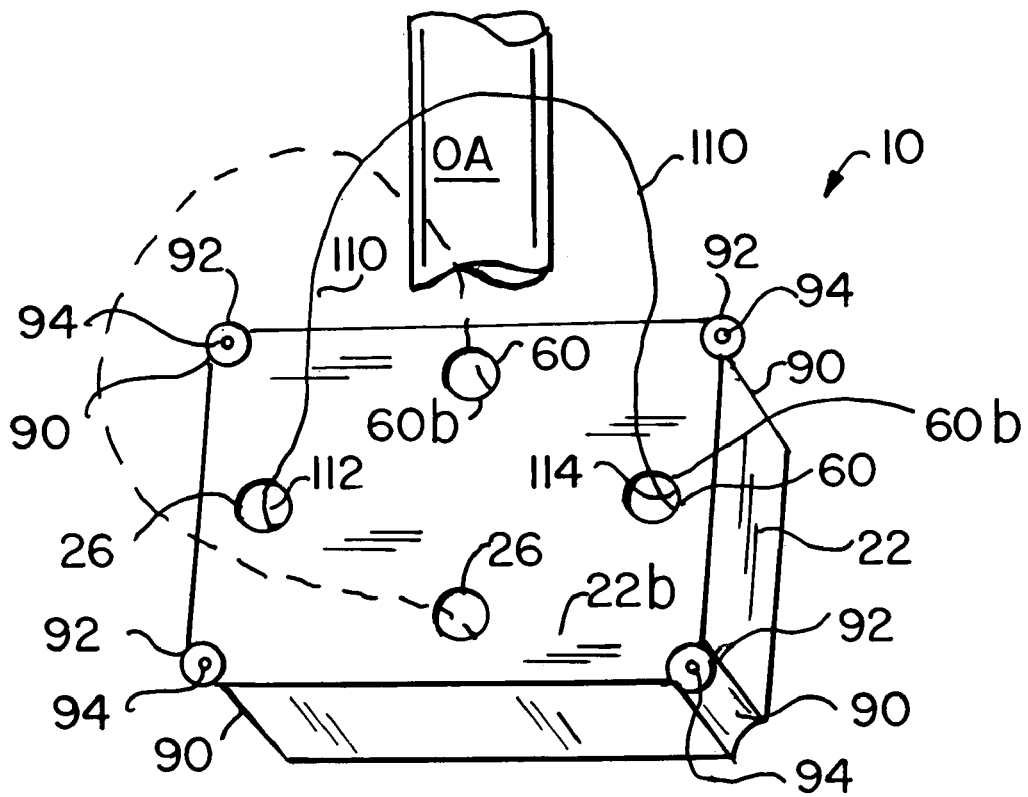
FIG. 3 is a perspective rear view of the locking box assembly, showing the anchoring cable looped around an anchoring object in the form of a post and having one anchoring cable end fitted into a locking port and the other anchoring cable end fitted through a cable passageway so that the locking cable can be pulled tight and secured with the port and passageway locks around the anchoring object.
Figure 4:
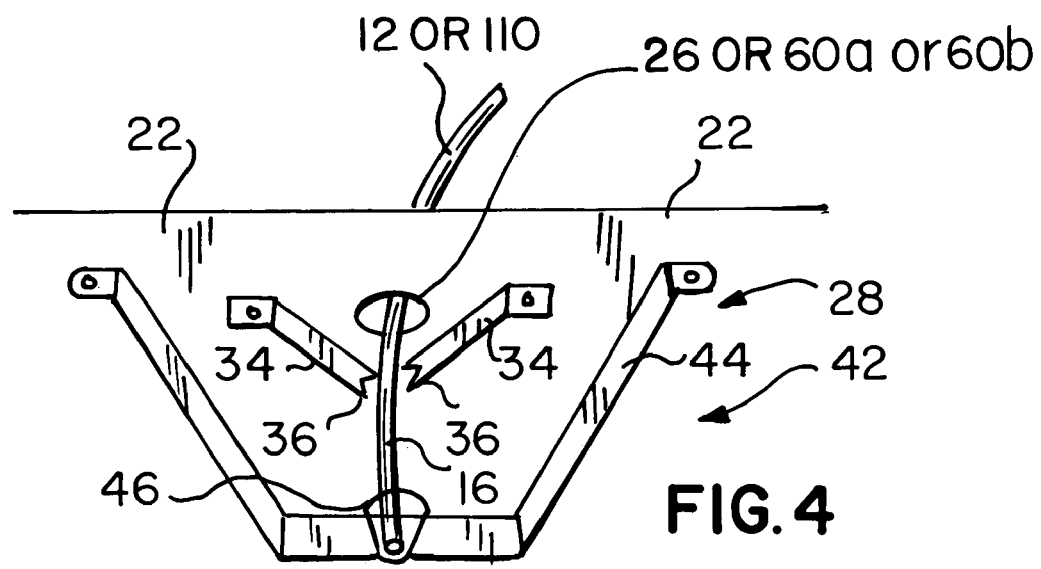
FIG. 4 is a broken away side view of the locking box showing the permanent locking strip lock within a cable locking port, which can also be provided within a cable passageway, either within the passageway tube or where the passageway tube is omitted.

This construction permits the locking cable 12 can be can be deployed from the locking box 20 through the cable deploying port 24, looped around an object OS to be secured and optionally around or through an anchoring object AO as well, and the cable locking end 16 then fitted into the cable locking port 26 so that the port lock 28 within the port 26 engages the cable locking end 16. The port lock 28 may provide permanent cable 12 engagement, and in this instance the port lock 28 may take the form of resiliently pivoting metal strips 34 secured to the box wall 22 inward face adjacent the cable locking port 26 as shown in FIG. 3. The metal locking strips 34 preferably have sharp engaging ends 36 with cable engaging inward V-shapes or other irregularities. A cable blocking structure 42 including a blocking structure bracket 44 secured to the box wall 22 and a cable end receiving cup 46 secured to the blocking structure bracket 44 is provided for stopping the cable 12 or anchoring cable 110 (described below) after it is inserted into a locking port 26 a certain pre-set distance. An outwardly directed port lock key slot 32, or a combination lock dial (not shown), preferably is provided on the box wall 22 adjacent the corresponding cable locking port 26 for receiving a key to open the port lock 28 to release the cable locking end 16 from the cable locking port 26.

The locking box 20 preferably additionally includes at least one cable passageway 60 including a passageway tube 62 extending through the locking box 20 so that the cable 12 can be looped around or through an object OS and the cable locking end 16 then inserted into a first passageway end 60*a*, passed through the box 20 and out of the second passageway end 60*b*. The cable locking end 16 can then be inserted into and locked within a cable locking port 26, or a passageway lock 64 may be provided in the cable passageway 60 to lock either the cable locking end 16 or a portion of the cable 12 beyond the cable locking end 16 within the passageway 60. Once again, either the locking strips 34 can be used in the passageway 60 to permanently engage the cable 12, or an outwardly directed passageway lock key slot 32 or a combination lock dial (not shown) preferably is provided on the box wall 22 adjacent the corresponding cable passageway 60 for receiving a key to open the passageway lock 64 to release the cable 12 from the cable passageway 60. Port locks 28 and passageway locks 64 preferably are operated with the same key (not shown), so that only one key is needed for each locking box assembly 10. In some instances, two, four or some other number of locking box assemblies 10 may be sold as a set or pack, and all the set would be operated with the same key. Obviously a non-matching key would be needed to operate a different set of locking assemblies 10.

Cable retaining means 40 are provided preferably includes a cable spool 70 around which the cable 12 is wound, the spool 70 being rotatably mounted to the spool mounting means in the form of spool mounting brackets 72 to locking box wall 22 within the locking box 20. The spool 70 rotates in a cable deploying direction to dispense the cable 12 through the cable deploying port 24 as the user manually pulls the cable out of the locking box 20. The cable spool 70 preferably is biased with a biasing spring 74 to rotate automatically in a cable retracting direction unless overcome by a greater pulling force exerted by a user hand in the opposite direction, to automatically retract and gather the cable 12 upon release of the cable 12 from a cable locking port 26, cable passageway 60 or user hand, when the locking box 20 is removed from the object OS to be secured and stored. The locking cable 12 preferably rides over an idler pulley 80 rotatably mounted within the locking box 20 on idler pulley mounting brackets 78 secured to box wall 22 with locking box 20. Idler pulley mounting brackets 78 are close enough to the idler pulley 80 ends to prevent the cable 12 from riding off idler pulley 80. A releasable spool holding mechanism 80, of known design on vacuum cleaner cords and other cord items, preferably is provided so that the spool 70 releasibly locks against rotation when the cable 12 is deployed to any given length and released to retract, and then is unlocked so that the biasing spring 74 can rotate the spool 70 to retract the cable 12 upon the user abruptly pulling the cable 12 a short distance outwardly from the box 20 and then releasing the cable 12 to retract into the box 20.

The cable 12 can secure the locking box 20 to an object to be secured OS and optionally to an anchoring object OA as well. In addition, two alternative anchoring mechanisms are provided for anchoring the locking box 20 to an anchoring object OA. One such anchoring mechanism includes a screw notch 90 extending from the box front wall 22a to box rear wall 22b of each corner of the locking box 20, the screw notches 90 preferably having quarter circle cross-sections, with portions of the box rear wall 22b extending into each screw notch 90 to define a mounting tab 92 with a tab port 94. An anchoring screw 96 is inserted into each tab port 94 and into an anchoring object OA such as a wall or a post. See FIG. 1.

The other such anchoring mechanism includes an anchoring cable 110, separate from the locking cable 12 which is provided separately from the locking box 20. The anchoring cable 110 has two free anchoring cable ends 112 and 114, one anchoring cable end 112 being is fitted and locked into a locking port 26 containing a port lock 28 for permanently engaging the anchoring cable end 112, and the other anchoring cable end 114 being fitted around or through an anchoring object OA such as a truck bed bracket B and through a cable passageway 60 until the anchoring cable 110 is pulled tight around or through the anchoring object OA so that the locking box 20 is firmly secured. See FIGS. 3 and 5. Two locking ports 26 preferably are provided in the box front wall 22a, one adjacent to a lateral edge and the other adjacent to a longitudinal edge, and two cable passageways 60 are provided, at lateral and longitudinal ends opposing the locking ports 26. This configuration permits the anchoring cable 110 to extend across the box rear wall 22b either laterally or longitudinally, depending on the particular locking box 20 orientation best suited for a particular securing job.

For permanent locking of a the locking box 12 to an anchoring object OA, the anchoring cable 110 can be fitted through a cable passageway 60 and the protruding anchoring cable end 112 or 114 cut away. Plugs 82 for cable locking ports 26 and cable passageways 60 preferably are provided which fit into the ports 26 and passageways 60, preferably permanently, to prevent dirt and debris from entering the box 20 through unused ports 26. Each locking plug 82 preferably is a disk with a circumferential plug flange 84 extending outwardly from the middle of the disk perimeter surface 86. A series of inwardly angled plug locking tabs 88 preferably are provided within each locking port 26 or cable passageway 60 end to lockingly engage the plug flange 84 as a plug 82 is manually snapped into the locking port 26 or cable passageway end 60a or 60b. See FIG. 7. Upon being snapped into place, the plugs 82 preferably fit substantially flush with the box wall 22 for aesthetic purposes and to prevent user clothing and other objects from being snagged on the plugs 82.

While the invention has been described, disclosed, illustrated and shown in various terms or certain embodiments or modifications which it has assumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim as my invention:
1. A locking box assembly, comprising:
a length of cable having a cable secured end and a cable locking end;
cable retaining means;
and a locking box for retaining said cable, said cable secured end being fastened to said locking box with said cable retaining means, said locking box having a box wall with a cable deploying port and a cable locking port having a port lock for receiving said cable locking end and locking said cable;
such that said cable can be can be deployed from said locking box through said cable deploying port, looped to engage an object to be secured, and said cable locking end then can be fitted into said cable locking port such that said port lock within said cable locking port engages said cable locking end.

2. The locking box assembly of claim 1, additionally comprising at least one cable passageway extending through said locking box having a first passageway end and a second passageway end, such that said cable can be deployed and looped to engage an object and said cable locking end then be inserted into said first passageway end, passed through said box and out of said second passageway end, and said cable locking end then can be one of: inserted into and locked within a said cable locking port and engaged by a passageway lock within said cable passageway.

3. The locking box assembly of claim 1, additionally comprising cable retaining means, said cable retaining means comprising a cable spool around which said cable is wound, said spool being rotatably mounted to spool mounting means in said locking box;
wherein said spool rotates in a cable deploying direction to dispense said cable through said cable deploying port as a user manually pulls the cable out of the locking box.

4. The locking box assembly of claim 3, wherein said cable spool is spring biased by spring means to rotate in a cable retracting direction, to automatically retract and gather said cable on said spool upon release of said cable.

5. The locking box assembly of claim 1, additionally comprising a releasable spool holding mechanism causing said spool to lock against rotation when released when said cable is deployed to any given length, and then is unlocked such that said cable biasing means rotates said spool to retract said cable upon the user abruptly pulling said cable a short distance outwardly from said box and then releasing said cable to retract into said locking box.

6. The locking box assembly of claim 1, additionally comprising plugs for fitting into and closing said cable locking port and said cable passageway first and second ends.

7. A locking box assembly, comprising:

a length of cable having a cable secured end and a cable locking end;

cable retaining means;

and a locking box for retaining said cable, said cable secured end being fastened to said locking box with said cable retaining means, said locking box having a box wall with a cable deploying port and a cable locking port having a port lock for receiving said cable locking end and locking said cable;

such that said cable can be can be deployed from said locking box through said cable deploying port, looped to engage an object to be secured, and said cable locking end then can be fitted into said cable locking port such that said port lock within said cable locking port engages said cable locking end;

and an outwardly directed port lock key slot on said box wall adjacent the corresponding said cable locking port for receiving a key to open said port lock to release said cable from said cable locking port.

8. A locking box assembly, comprising:

a length of cable having a cable secured end and a cable locking end;

cable retaining means;

and a locking box for retaining said cable, said cable secured end being fastened to said locking box with said cable retaining means, said locking box having a box wall with a cable deploying port and a cable locking port having a port lock for receiving said cable locking end and locking said cable;

such that said cable can be can be deployed from said locking box through said cable deploying port, looped to engage an object to be secured, and said cable locking end then can be fitted into said cable locking port such that said port lock within said cable locking port engages said cable locking end;

at least one cable passageway extending through said locking box having a first passageway end and a second passageway end, such that said cable can be deployed and looped to engage an object and said cable locking end then be inserted into said first passageway end, passed through said box and out of said second passageway end, and said cable locking end then can be one of: inserted into and locked within a cable locking port and engaged by a passageway lock within said cable passageway;

an outwardly directed passageway lock key slot on said box wall adjacent the corresponding said cable passageway for receiving a key to open said passageway lock to release said cable from said cable passageway.

9. A locking box assembly, comprising:

a length of cable having a cable secured end and a cable locking end;

cable retaining means;

and a locking box for retaining said cable, said cable secured end being fastened to said locking box with said cable retaining means, said locking box having a box wall with a cable deploying port and having at least one cable passageway extending through said locking box having a first passageway end and a second passageway end in said box wall, such that said cable can be deployed and looped to engage an object and said cable locking end then be inserted into said first passageway end, passed through said box and out of said second passageway end, and said cable locking end then can be engaged by a passageway lock within said cable passageway;

such that said cable can be can be deployed from said locking box through said cable deploying port, looped to engage an object to be secured, and said cable locking end then can be fitted into and through said cable passageway such that said passageway lock within said cable passageway engages said cable.

10. The locking box assembly of claim 9, additionally comprising a cable locking port having a port lock for receiving said cable locking end and locking said cable.

* * * * *